(12) United States Patent
Kohlhoff

(10) Patent No.: US 10,417,924 B2
(45) Date of Patent: Sep. 17, 2019

(54) VISUAL WORK INSTRUCTIONS FOR ASSEMBLING PRODUCT

(71) Applicant: SAP SE, Walldorf (DE)

(72) Inventor: Stephan Kohlhoff, Darmstadt (DE)

(73) Assignee: SAP SE, Walldorf (DE)

( * ) Notice: Subject to any disclaimer, the term of this patent is extended or adjusted under 35 U.S.C. 154(b) by 263 days.

(21) Appl. No.: 15/349,998

(22) Filed: Nov. 11, 2016

(65) Prior Publication Data

US 2018/0136793 A1 May 17, 2018

(51) Int. Cl.
*G06F 3/048* (2013.01)
*G09B 5/02* (2006.01)

(52) U.S. Cl.
CPC ..................... *G09B 5/02* (2013.01)

(58) Field of Classification Search
None
See application file for complete search history.

(56) References Cited

U.S. PATENT DOCUMENTS

| | | | | |
|---|---|---|---|---|
| 6,240,328 B1* | 5/2001 | LaLonde | ................ | G06Q 10/06 700/95 |
| 6,826,500 B2* | 11/2004 | Linthicum | .............. | G06F 17/50 702/98 |
| 8,027,745 B1* | 9/2011 | Freeze | ................... | G06Q 10/06 700/106 |
| 8,401,687 B2* | 3/2013 | Kohlhoff | ................ | G06T 19/00 700/105 |
| 8,624,924 B2 | 1/2014 | Dobbins et al. | | |
| 2003/0067487 A1* | 4/2003 | Kohls | ..................... | G06F 17/50 715/764 |
| 2003/0103083 A1* | 6/2003 | Denny | .................... | G06F 17/50 715/771 |
| 2004/0143352 A1* | 7/2004 | Gyorfi | .................... | G06Q 10/06 700/99 |
| 2004/0143811 A1* | 7/2004 | Kaelicke | .................. | G06F 8/20 717/101 |

(Continued)

OTHER PUBLICATIONS

Assembly Design & Documentation Project, Mar., 2006, p. 1-15, National Center for Manufacturing Sciences—Commercial Technologies for Maintenance Activities.

*Primary Examiner* — Hua Lu
(74) *Attorney, Agent, or Firm* — Buckley, Maschoff & Talwalkar LLC

(57) ABSTRACT

Methods and system are disclosed that generate configurable visual work instructions. In one aspect, information to assemble multiple variants of a product is compiled, determined by multiple routing operations and allocation of multiple components of the product to the multiple routing operations. A sequence of instructions to assemble the multiple variants of the product to verify an order of the multiple routing operations and the allocation of the components to the multiple operations may be simulated. Upon verification, a superset of visual work instructions corresponding to the sequence of instructions to assemble the multiple variants of the product may be generated. Upon receiving a request to assemble a desired variant of the product, a configuration including attributes associated with the desired variant of the product may be generated. Based on the configuration, the superset of visual work instructions may be reduced to a subset of visual work instructions.

20 Claims, 6 Drawing Sheets

(56) References Cited

U.S. PATENT DOCUMENTS

| | | | | |
|---|---|---|---|---|
| 2008/0165189 A1* | 7/2008 | Nakayama | ............... | G06T 13/20 345/420 |
| 2010/0031226 A1* | 2/2010 | Chaar | ........................ | G06F 8/20 717/101 |
| 2012/0256914 A1* | 10/2012 | Chevochot | .......... | G06F 17/5004 345/419 |
| 2013/0117710 A1* | 5/2013 | Walter | .................... | G06Q 10/06 715/790 |
| 2013/0191094 A1* | 7/2013 | Akahoshi | ............ | G06F 17/5009 703/6 |
| 2014/0118358 A1* | 5/2014 | Enomoto | ................. | G06T 13/20 345/473 |
| 2014/0333618 A1* | 11/2014 | Bogues | ................... | G06F 17/50 345/420 |
| 2015/0058052 A1* | 2/2015 | Kohlhoff | ............ | G06Q 10/0875 705/7.12 |
| 2015/0234560 A1* | 8/2015 | Carter | ..................... | G06F 17/50 715/744 |
| 2016/0048293 A1* | 2/2016 | Chen | ................... | G06F 3/04815 715/851 |
| 2016/0314704 A1 | 10/2016 | Bell | | |
| 2017/0091690 A1* | 3/2017 | Halasi | .............. | G06Q 10/06315 |

\* cited by examiner

VISUAL WORK INSTRUCTIONS FOR ASSEMBLING PRODUCT

BACKGROUND

Work instructions in a manufacturing process or production environment contribute significantly to the production master data. Work instructions may depend on type of production and may be represented in different formats, such as text, photographs, screen shots, drawings, multimedia content like videos, presentations, etc. Often, the work instructions may be compiled and stored in multiple formats and multiple documents. Managing work instructions from multiple documents is not only time consuming, but also a cumbersome task. Further, the complexity of managing work instructions from multiple documents becomes challenging when the work instructions are subject to changes in design, manufacturing, etc. When a product may be manufactured in multiple variants or multiple configurations, managing work instructions for each configuration or variant of the product, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques related to visual work instructions for assembling product are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In an embodiment, an enterprise system may provide a platform to generate three dimensional (3D) visualizations. The 3D visualizations may be generated to visualize a type of manufacturing (e.g., welding, assembling, machining, etc.), e.g., before a product is subjected or undergoes a manufacturing process. For example, when the product includes multiple parts or components, it may be assembled in the manufacturing process. The sequence of steps for assembling the product may be simulated before the actual assembly of the product. In an embodiment, one or more camera positions in the manufacturing process may be provided, and routing of components or parts may be sequentially defined.

Figure 1:
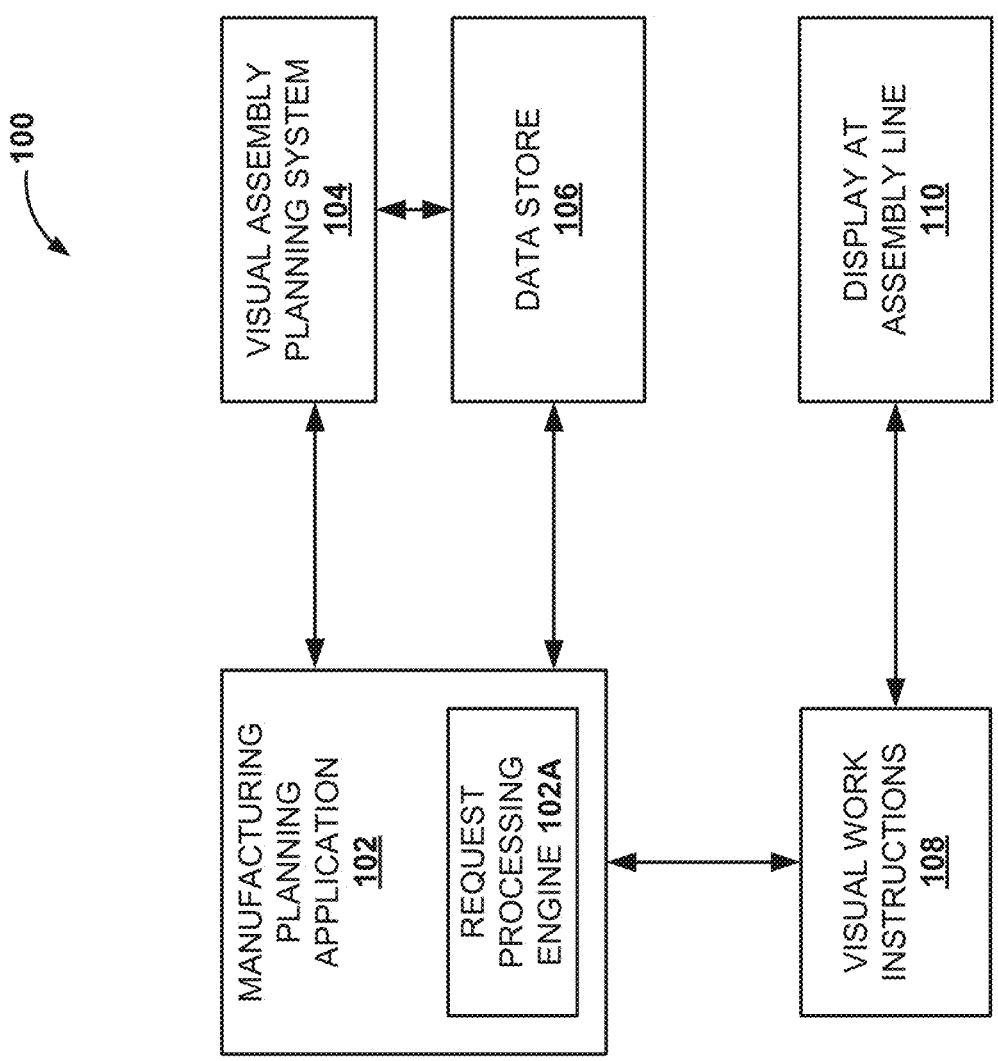
FIG. 1 is a block diagram illustrating environment to generate a set of visual work instructions for consumption at an assembly line in a manufacturing process, according to an embodiment.

FIG. 1 is a block diagram illustrating environment 100 to generate visual work instructions for consumption at an assembly line in a manufacturing process, according to an embodiment. FIG. 1 shows manufacturing planning application 102 including request processing engine 102A working in cooperation with visual assembly planning system 104, data store 106 and display at assembly line 110 to generate a set of visual work instructions 108 for assembling a product in a manufacturing process. In an embodiment, manufacturing planning application 102 working in cooperation with visual assembly planning system 104 may provide a platform of software routines, software components, data models, business models, engines, etc., that may be integrated to work in cooperation with each other to execute specific functions or operations. The software routines, software components, data models, business models, engines, etc., may be instantiated in sequence to execute such functions or operations.

In an embodiment, manufacturing planning application 102 may include routines, software components, etc., associated with processing requests, determining attributes (e.g., variants, configurations, characteristics, etc.) associated with a product, retrieving the attributes and/or attributes values associated with the product from data store 106, instantiating visual assembly planning system 104, etc. The manufacturing planning application 102 includes request processing engine 102A that may process the received requests. By cooperatively working with each other, the above routines, software components, etc., may provide a mechanism for generating a set of visual work instructions (e.g., 108) that may be consumed (e.g., displayed at assembly line 110) at the assembly line in the manufacturing process, to assemble a specific variant of the product. For example, determining the variant or configuration of the product to be assembled may depend on the attributes associated with the product. In an embodiment, a product variant as such may be selected and predefined attributes (and attribute values) corresponding to the selected product variant may then be retrieved automatically from data store 106.

In an embodiment, visual assembly planning system 104 may generate a superset of graphical visualizations for assembling the product. For example, visual assembly planning system 104 may retrieve engineering design data (e.g., 3 dimensional images of components or parts of the product) stored in data store 106 to generate graphical visualizations for assembling possible different variants of the product. The graphical visualizations may include information (e.g., routing of components or parts, allocation of components, position of cameras, configuration attributes, etc.) for assembling possible different variants the product. The visual assembly planning system 104 may provide a platform for determining (e.g., allocation of components or parts based on attributes of the product, routing information of the components, etc.), visualizing, validating, etc., the sequence of product assembly for the possible product variants.

In an embodiment, visual assembly planning system 104 may provide a platform for defining bill of materials (BOM) that may be used to assemble any variant of the product. In an embodiment, a resulting super BOM may correspond to a multi-level document that may include data (e.g., build data) for multiple product variants, covering all components or variants of components, sub-assemblies (products within products), etc. The super BOM may include part numbers, approved manufacturers list (AML), mechanical characteristics, component descriptors, etc., for each component or variant of the product. In an embodiment, the super BOM may be used for communication between manufacturing partners, or confined to a single manufacturing process. In an embodiment, multiple variants of a product may be defined in the super BOM that may include routing information and corresponding visual work instructions.

By using the result of visual assembly planning 104, a superset of visual work instructions may be created. For example, once the components contained in the superset of BOMs are allocated to correct operations of routing and assigned in a correct sequence per operation, a work file containing the superset of visual work instructions can be created. For some or each operation in the routing, a so-called procedure may be created. For different camera positions, different steps may be created within the respective procedure. The parts or components that are assigned to a particular operation will be assigned to respective steps of the corresponding procedure. Accordingly, the work file with the superset of visual work instructions contains these procedures and steps, where each procedure contains one or more steps, and where a step stores the camera position and the visibility of the product parts. As the assembly progresses, the corresponding steps may visualize the components for specific variants of the product with the correct view. In an embodiment, the components that installed during a particular step may be highlighted.

In an embodiment, the visual work instructions may include a sequence of operations to be executed for assembling the product, allocation and routing information of the components or parts of the product, 3D graphical representations of the components that may be assembled at the assembly line in the manufacturing process, etc. Based on the selected attributes, specific variants or configurations of the product may be assembled. In an embodiment, the 3D graphical representations of the components or parts of the product may be replicated from 3D product engineering design data. The 3D graphical representations of the components may be stored in data store 106.

In an embodiment, visual assembly planning system 104 may be executed to validate a sequence of the product assembly, determine the components or parts that may be used for the product assembly, etc. Once a fully or sufficiently exhaustive set of possible variants or configuration of the components or parts of the product are determined, the sequence of multiple operations to be executed for assembling the product may be defined. Each operation in the sequence of multiple operations may include information on how different variants or configurations of the product may be assembled.

In an embodiment, the above information may include definitions of allocation of the components or parts, routing information of each component or part, etc., that may be used to assemble the product. In an embodiment, the instantiation of a visual planning assembly model may generate product assembly simulations for the variants of the product. For example, 3D simulations may be generated to provide visual cues or information on how the product may be assembled. An end user may consume this visual information and may modify the allocation of the components or parts, routing information for assembling the product, etc., using the visual assembly planning system. For example, such modifications may include modifying positional information of the cameras, allocation of the components or parts in specific routing orders, etc. In an embodiment, the allocation of the components in the specific routing orders may be reordered. Upon successfully validating the product assembly via visual assembly planning system 104, a superset of visual work instructions may be derived or generated (e.g., 108), which superset of visual work instructions is to form the basis for later assembling a selected and specific variant of the product.

Upon validating the sequence of product assembly, a work file including a superset of visual work instructions may be generated. The work file including the superset of visual work instructions may encompass multiple variants or configurations of the product. A variant or configuration of the product may be characterized by one or more attributes of the product (e.g., color, region specific configuration of components or parts, etc.).

In an embodiment, the work file with the superset of visual work instructions may afterwards be modified based on selected or retrieved attributes (and attribute values) of a variant of the product to be assembled. In an embodiment, based on the selected or retrieved attributes of the product, a work file including a subset of visual work instructions may be generated. In other words, by selecting a product variant and thereby the attributes of the product to be actually assembled, the information contained in the work file with the superset of visual work instructions is reduced to correspond to the desired product variant or product configuration.

Figure 2:
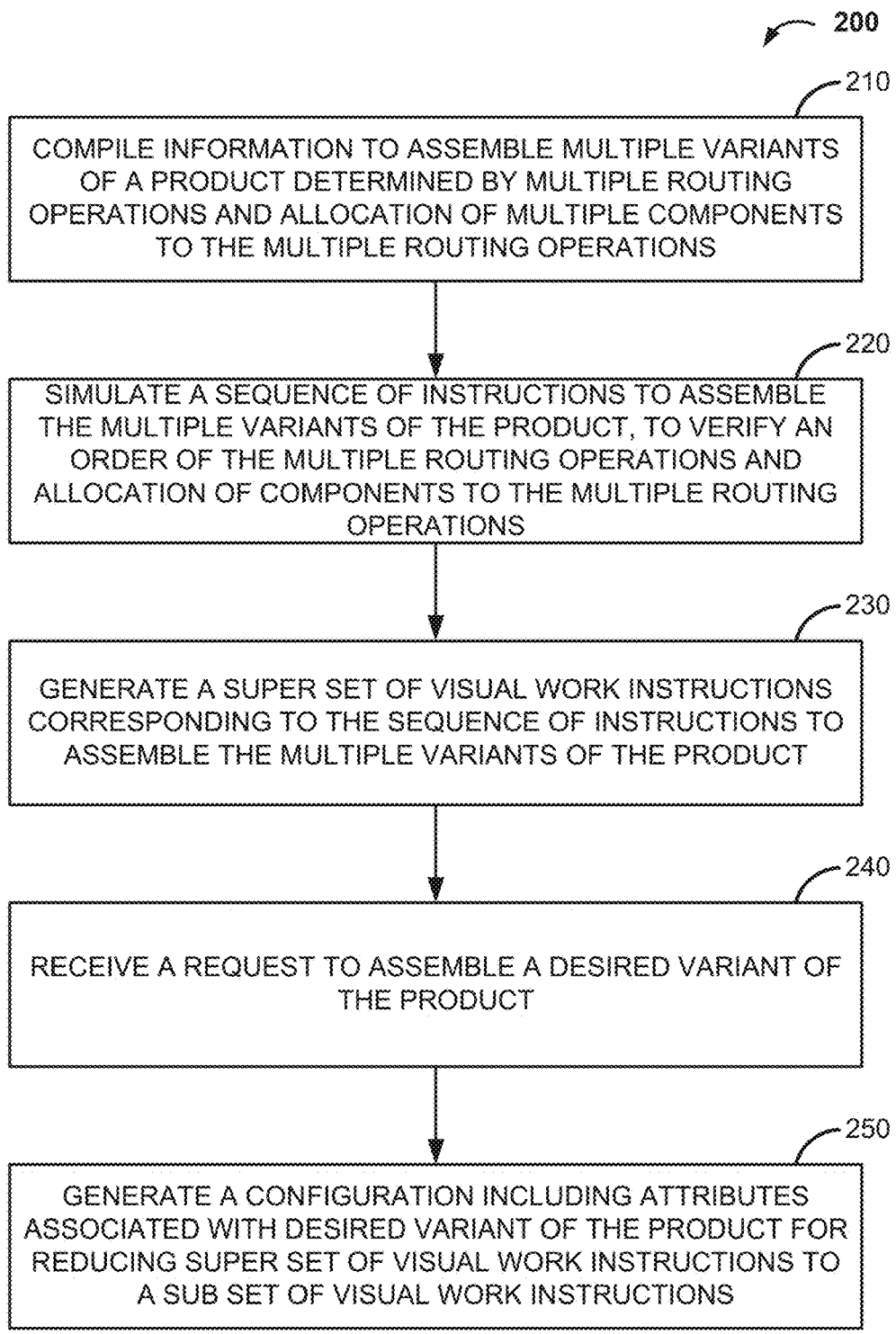
FIG. 2 is a flow diagram illustrating a process to generate visual work instructions for assembling a product at an assembly line in a manufacturing process, according to an embodiment.

FIG. 2 is a flow diagram illustrating a process 200 to generate visual work instructions for assembling a variant product at an assembly line in a manufacturing process, according to an embodiment. In an embodiment, visual work instructions to assemble a specific variant or configuration of a product may be generated from a superset of visual work instructions. In an embodiment, at 210, information to assemble multiple variants of a product determined by multiple routing operations and allocation of multiple components to the multiple operations is compiled. For example, the product may be available in multiple variants or multiple configurations. The product information such as, components or parts of the products that may be used to assemble multiple variants of the product may be retrieved from a data store. The information may be compiled by cooperatively working between the visual assembly planning system, manufacturing planning application and data store. In an embodiment, the data store may store the product information including components or parts of the products, 3D graphical representations of the components or parts, engineering data, manufacturing data, etc. Based on the compiled information, at 220, a sequence of instructions to assemble the multiple variants of the product to verify an order of the multiple routing operations and allocation of components of the multiple routing operations is simulated.

In an embodiment, the multiple routing operations and allocation of components to the multiple routing operations may be simulated by the visual assembly planning system. The visual assembly planning system may also provide a platform to modify the routing operations, allocation of the components to the routing operations, modify or adjust camera positions capturing the routing operations, etc.

In an embodiment, based on the verification, at 230, a superset of visual work instructions corresponding to the sequence of instructions to assemble the multiple variants of the product may be generated. In an embodiment, the generated superset of visual work instructions may correspond to instructions for assembling the multiple variants of the product determined by the multiple routing operations and the allocation of multiple components associated with the multiple operations, that were compiled, at 210, as discussed previously. The superset of visual work instructions may be generated at manufacturing planning application and stored in the data store.

In an embodiment, a request to assemble a variant of the product is received, at 240. (e.g., at the manufacturing planning application 102 of FIG. 1). A request to assemble a certain variant or a certain configuration of the product may be received as a result of a customer order via an Enterprise Resource Planning (ERP) system. The variant of the product may be assembled by selecting or retrieving specific attributes (e.g., product characteristics or characteristic values) that may characterize the variant of the product. In an embodiment, a request processing engine working in cooperation with the manufacturing planning application may process the received request. For example, processing the request may include determining attributes, attribute values, associated information such as, configuration, variant, type, etc., of the product to be assembled. Parameters associated with the product may be used to determine specific components or parts that may be used to assemble the product. Upon such determinations, at 250, a configuration including attributes associated with the desired variant of the product for reducing the superset of visual work instructions to a sub set of visual work instructions is generated.

In an embodiment, the configuration including the attributes associated with the desired variant of the product may be generated by an automatic configuration routine (e.g., sequence of process steps including instructions executed by a processor of a computer) that may work in cooperation with the manufacturing planning application. The execution of the automatic configuration routine may be used to generate a configuration file, which may be consumed in conjunction with the superset of visual work instructions to generate a sub set of visual work instructions from the superset of visual work instructions. The execution of the automatic configuration routine results in the generation of individualized work instructions to provide visualization of a sequence of operations to be executed for assembling the desired variant of the product, which may include allocation and routing information of the components or parts associated with the variant of the product, etc.

In an embodiment, upon receiving the request to assemble the desired variant of the product, the attributes of the product variant as well as the work file with the superset of work instructions are retrieved from the data store. At the same time, a configuration file may be created, e.g., upon executing the automatic configuration routine. This configuration file may contain commands to suppress all items in the work file with the superset of visual work instructions which do not belong to the requested product variant. Accordingly, only those parts of the superset of work instructions that are needed to assemble the requested product variant are being displayed at the assembly line in the manufacturing process, while unnecessary elements are suppressed from being displayed. In an embodiment, the work file with the superset of visual work instruction and the configuration file may be sent down to a shop floor, where they may be consumed by displaying the procedure for the operation at hand in a standard viewer, which can be integrated in one or more different kinds of applications designed for exposing work instructions to an operator at a particular station of an assembly line. In addition, the viewer may be instructed to suppress the display of those parts which have been filtered out, using the commands in the configuration file, i.e. hide all parts, which are not part of the specific product configuration.

In an embodiment, alternatively a new work file with visual work instructions may be created for the requested product variant by selecting from the superset of visual instructions only those parts that belong to the particular configuration corresponding to the requested product variant. As a result, an individual subset of visual work instructions is stored in the new work file, thereby reducing the size of the work file including the subset of the visual work instructions. The reduced size of work file may be consumed in real time at the assembly line to assemble the product via the manufacturing process. The reduced work file containing the individual subset of work instruction and thereby all information needed to assemble the product variant for a respective customer order, may be sent to the shop floor directly, without needing any additional configuration file and any implementation of configuration capabilities in the viewer. In both ways, it now becomes possible to directly connect the ERP process for receiving a customer order with product configuration information and for accordingly selecting a desired product variant, with the automatic generation of a corresponding individualized visual work instruction. This individually adapted visual work instruction may be used immediately at the assembly line, without requiring any longer any human interference to make some final adjustments according to the specific product configuration. The individualized visual work instructions (e.g., subset of visual work instructions) may be displayed using a display device, which can be embodied in a mobile device, a Manufacturing Execution System (MES) screen or an ERP screen.

In another embodiment, upon receiving the request to assemble the desired variant of the product, the attributes of the product variant as well as the work file with the superset of work instructions are retrieved from the data store. The attributes of the product may be rendered on a user interface and a user may select the attributes, based on the desired variant of the product. Based on the selection, the work file including the superset of visual work instructions may be reduced to a subset of visual work instructions.

Figure 3:
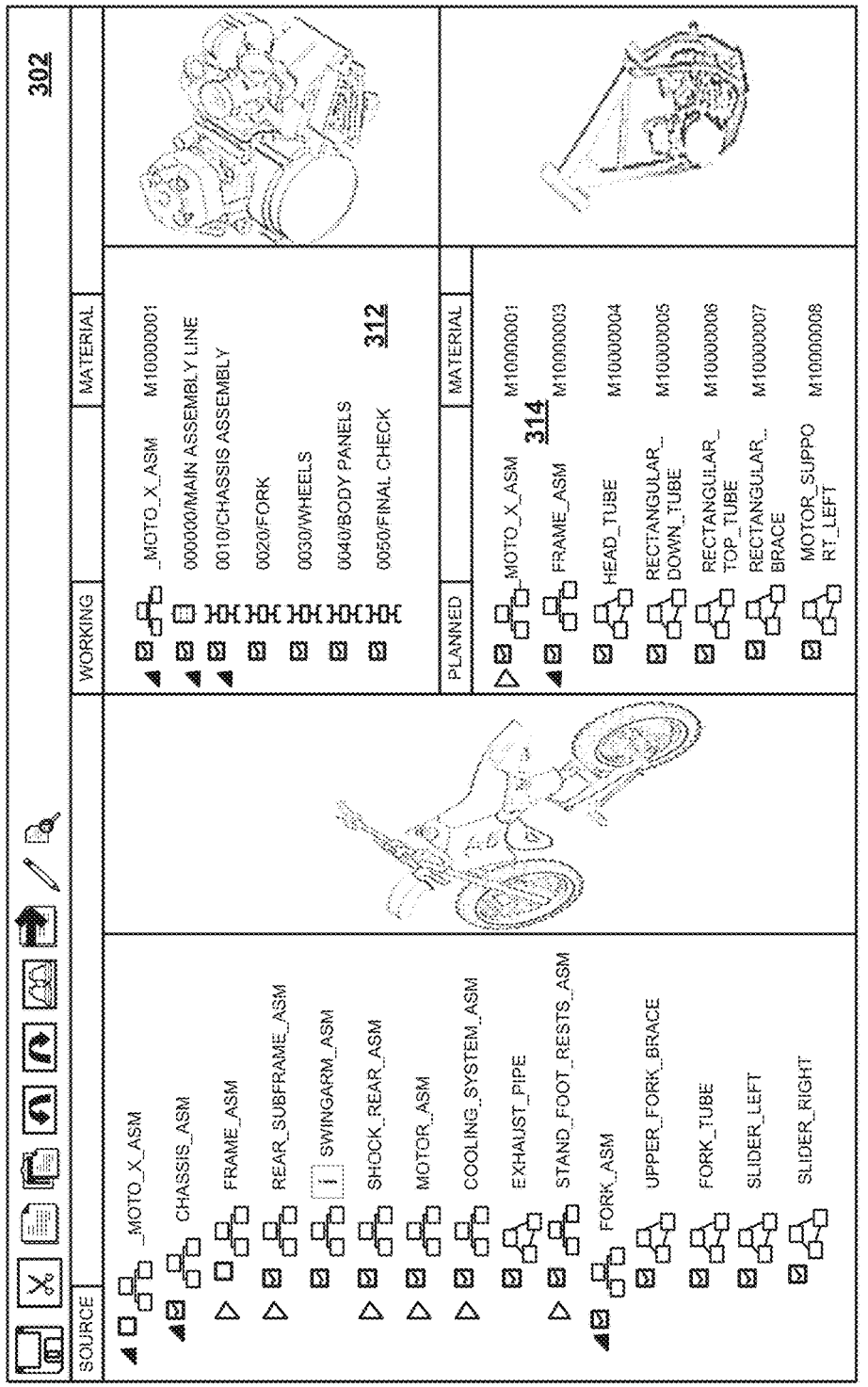
FIG. 3 is a user interface showing a visual assembly planning process, according to an embodiment.

FIG. 3 is user interface 302 showing a visual assembly planning process, according to an embodiment. In an embodiment, instantiating the visual assembly planning system may correspond to executing the visual assembly planning system. The visual assembly planning system may provide a platform for defining routing information and a sequence of assembling each BOM. In an embodiment, FIG. 3 shows user interface 302 that may be partitioned into sections (e.g., 304, 306, 308, 310), with each section displaying information associated with the product (e.g., attributes, attribute values, etc.), specific components or parts associated with the product, etc. For example, 304 displays the source structure which may represent an engineering BOM. The engineering BOM may be designed using an engineering designing system software (e.g., computer aided design (CAD)). 312 may correspond to displaying manufacturing BOM including routing information, operations to be executed, etc. For the assembly planning, parts or components may be moved from 304 to 314.

In an embodiment, based on the routing information corresponding to each BOM, sequence of operations to be executed corresponding to each BOM, etc., the sequence for assembling the product may be determined. For each operation, the above data or information may correspond to allocation of parts or components, routing information of the components or parts, etc. The above information may be modified upon determining whether or not to re-order or re-assign the parts or components in each operation. Such determination may enable a correct sequence of product assembly. In an embodiment, when the product includes multiple variants or configurations, a BOM referred to as a super BOM may be defined. The super BOM may correspond to include all the variants or configurations of the product. The variants or configurations may be defined or characterized by the attributes and attribute values. An end user may select the attributes and attribute values to assemble a desired variant or configuration of the product.

In an embodiment, to assemble a desired variant or configuration of the product, the work file including generated visual work instructions may be displayed and consumed (e.g., executed) at the assembly line in manufacturing process. In an embodiment, a superset of visual work instructions corresponding to all variants or configurations of the product (e.g., super BOM) may be generated. The generation of the work file including the superset of visual work instructions corresponding to the super BOM may eliminate the need for generating multiple work files for each variant of the product, each operation for assembling the product, etc. In an embodiment, the attributes and attribute values in the super BOM may be selected and a corresponding subset of visual work instructions for assembling the product may be generated. The generated subset of visual work instructions may be displayed and consumed at the assembly line in the manufacturing process to assemble the product.

In an embodiment, for each operation in the routing process, a procedure (e.g., sequence of steps including instructions executed by the processor of a computer) including a sequence of operations to be executed may be created. The procedure may include information related to routing of the components or parts, allocation of the components or parts, information related to camera positions to ensure correct assembly of the product, etc. In an embodiment, for information related to position of each camera, a step may be created within the procedure. All the parts or components, which may be assigned to a particular operation may be assigned to respective steps of the corresponding procedure.

Figure 4:
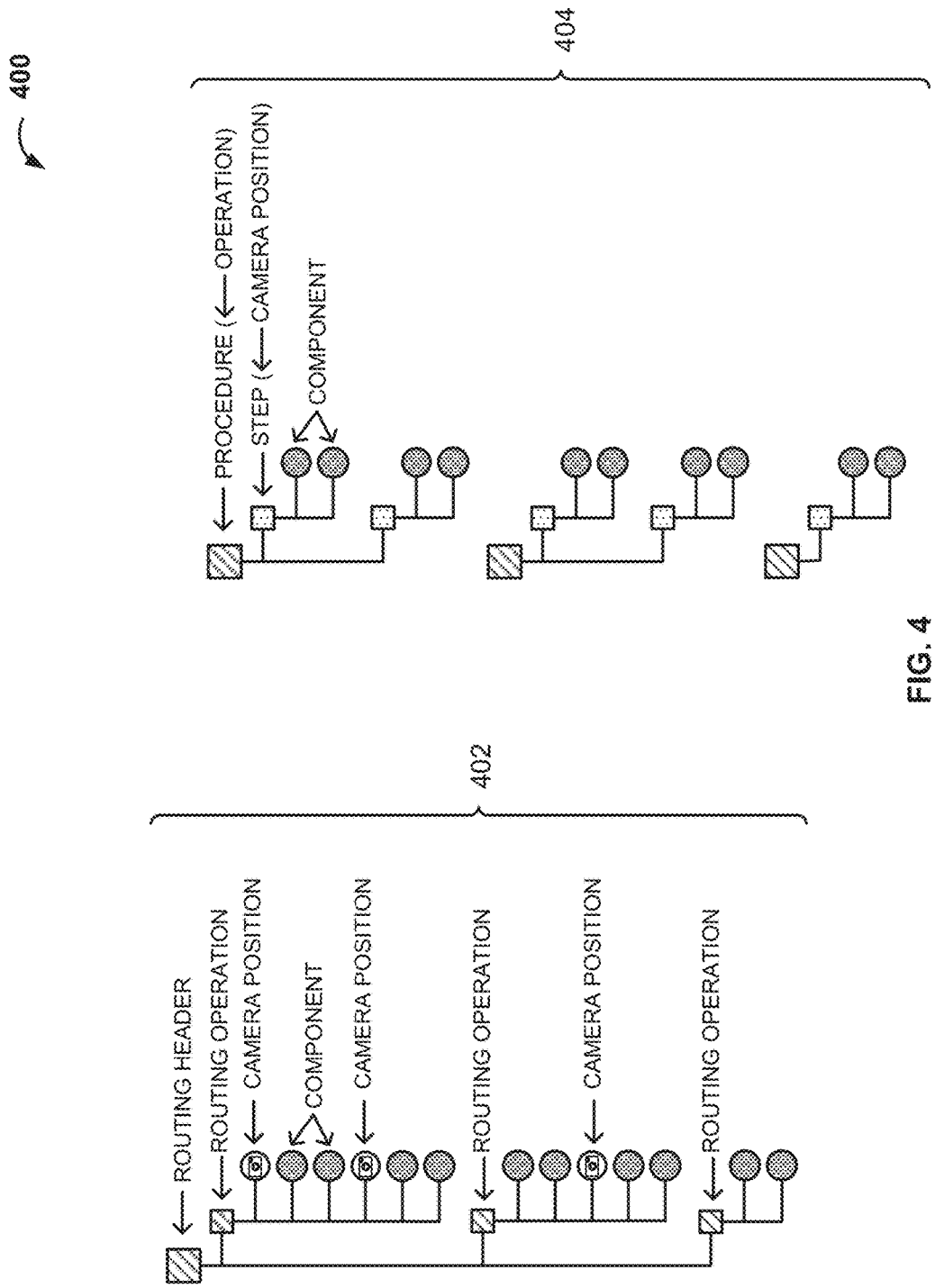
FIG. 4 is a block diagram showing generation of a superset of visual work instructions, according to an embodiment.

FIG. 4 is block diagram 400 showing generation of superset of visual work instructions, according to an embodiment. In an embodiment, master data for manufacturing may include all possible variants of allocation information (e.g., allocation of BOM for each operation), routing information of the components or parts, camera position information, etc. Such data may be used to generate visual work instructions that cover all product variants and possible configurations. For each camera position, a step including the information about the camera position may be created within the respective procedure (e.g., 402 and 404 shows information related to routing operation (e.g., routing header), camera position, component or parts, procedure (e.g., operation to be executed) etc.). The step (e.g., camera position) may provide the information about the component or part, which may be used to assemble the product.

In an embodiment, the work file including the superset of visual work instructions, may be generated for a combination of super BOM (e.g., all components or parts) and routing information. The visual assembly planning system may provide a platform for executing operations such as, generating textual information, annotations, animations, etc. In an embodiment, the manufacturing process may include assembling the product, and the superset of visual work instructions including the super BOM may be provided along with production master data to facilitate the product assembly. When an end user desires to assemble a specific variant or configuration of the product, the corresponding attributes and attribute values of the product may be selected or retrieved from a data store. Based on the selected attributes and attribute values, the work file including the superset of visual work instructions including the super BOM and routing information may be configured, by either reducing the visual work instructions to a corresponding subset, or by suppressing the displaying of unnecessary visual work instructions at the assembly line. Only the visual work instructions corresponding to the selected variant or configuration of the product may be executed to assemble the product.

In an embodiment, the generated visual work instructions may be displayed and consumed at the assembly line in the manufacturing process to assemble the product. For example, a single executable file including the superset of visual work instructions corresponding to the super BOM, and additionally a configuration file (e.g., corresponding to the attributes and attribute values of the product as selected by an end user) may be consumed at the assembly line in the manufacturing process. Based on the selected attributes, only the required subset of visual work instructions may be displayed, while unnecessary visual work instructions are suppressed from displaying.

Figure 5:
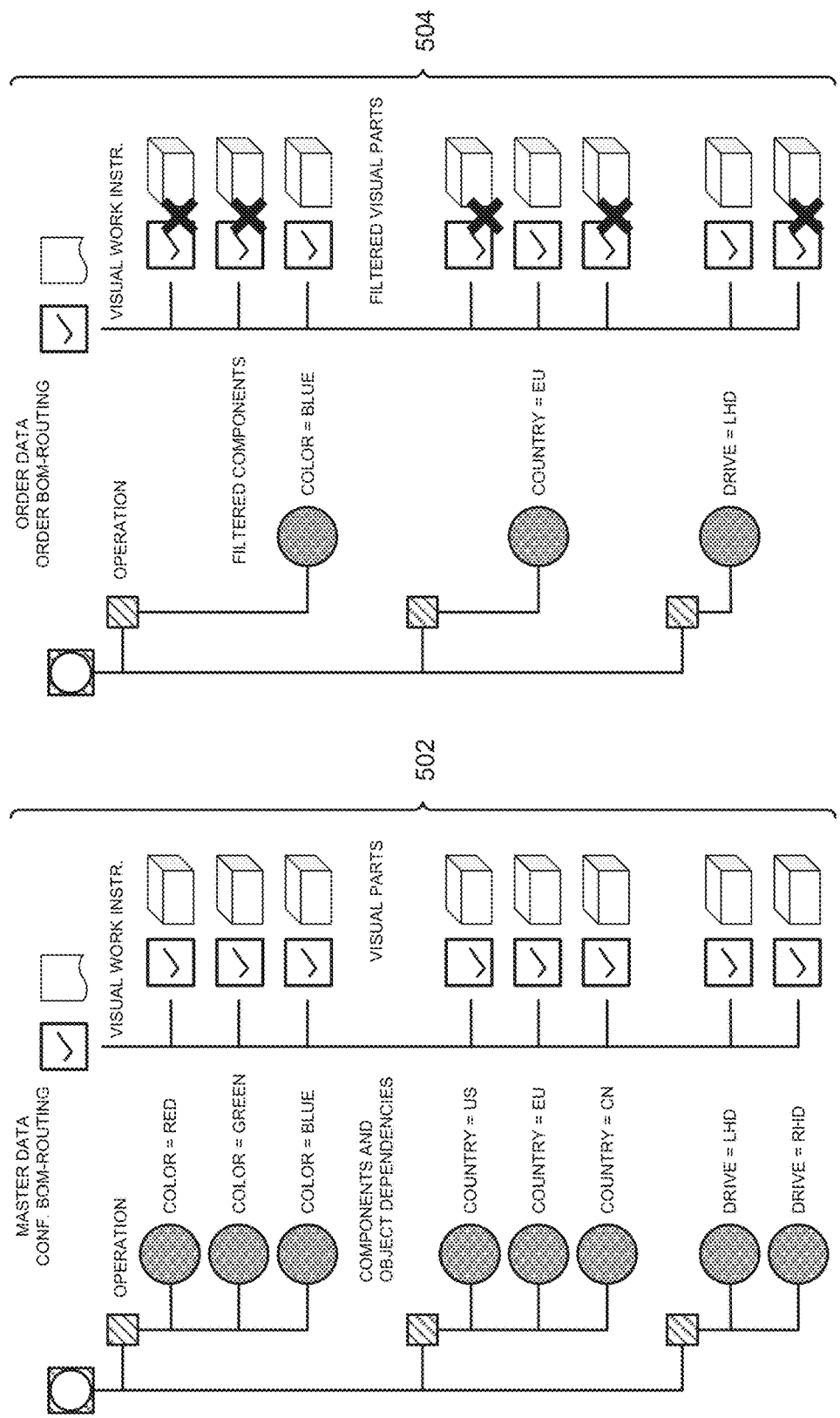
FIG. 5 is a block diagram showing selecting attributes for assembling a variant of a product by reducing a superset of visual work instructions to a subset of visual work instructions that corresponds to the variant of the product, according to an embodiment.

FIG. 5 is a block diagram showing selecting attributes for assembling a variant of a product by reducing a superset of visual work instructions to a subset of visual work instructions that correspond to the variant of the product, according to an embodiment. In an embodiment, attributes of a product (e.g., color, country specific norms or parameters, etc.) may be rendered on a user interface. The attributes of the product may be selected by an end user or automatically by processing a customer order via an ERP system. FIG. 5 shows the attributes and attribute values of the product (e.g., Master Data/Super BOM/Configurable BOM-Routing 502) and attributes selected by end user (e.g., Order Data/Order BOM-routing 504). Based on the selected attributes, visual work instructions for the corresponding variant or configuration of the product may be generated. In an embodiment, the generation of visual work instructions, as discussed previously eliminates the need for manually compiling work instructions for assembling a desired product variant in the manufacturing process. For example, manually compiling the work instructions for assembling the product from multiple documents, work files, etc., maintaining the documents or work files related to every operation with the assembling process, generating documents or work files for every configuration or variant of the product, etc.

In an embodiment, the generated subset of visual work instructions may provide visual cues or simulations of components, parts, etc., that may be used to assemble a variant of the product. The superset of visual work instructions are generated by working in cooperation with a visual assembly planning system. The automatic generation of the superset of configurable visual work instructions, and the later automatic filtering of only the required visual work instructions for a particular product configuration, may eliminate the need of cumbersome tasks of compiling information from multiple sources, document, work files, etc., such as, taking screen shots or using computer aided drawings (CAD) during the real time assembling of the product. Further, the fully automatic generation of visual work instructions may eliminate the need for supplemental textual work instructions. For example, when the textual work instructions may need translation, they may include translation errors leading to miscommunication.

In an embodiment, the sequence of assembly of the product may be modified via the visual assembly planning system. For example, allocation of BOM components or parts, the routing information of the BOM components or parts, etc., may be captured during the visual assembly planning system. Since the superset of visual work instructions is generated after validating the assembly sequence of the product, the visual work instructions that may be generated may be updated to reflect and include the modifications performed by the visual assembly planning system. For example, the camera positions may be modified and such modifications may be included in the visual work instructions, thereby eliminating the need of additional information for positioning the cameras during the assembling of the product.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
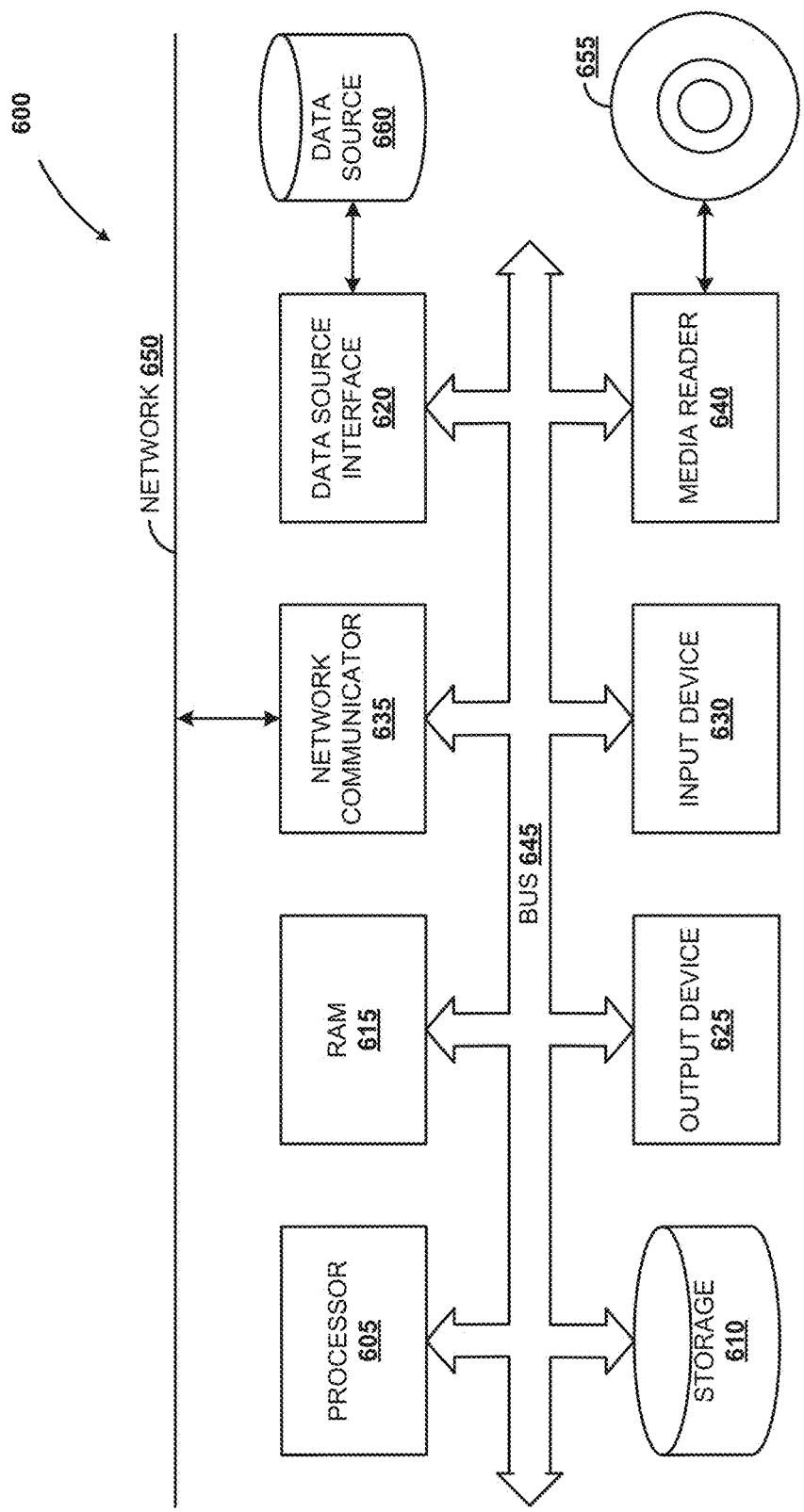
FIG. 6 is a block diagram of an exemplary computer system, according to an embodiment.

FIG. 6 is a block diagram of an exemplary computer system 600, according to an embodiment. Computer system 600 includes processor 605 that executes software instructions or code stored on computer readable storage medium 655 to perform the above-illustrated methods. For example, software instructions or code stored on computer readable storage medium 655 may correspond to the optimization algorithms, estimation algorithms, generate an optimum execution schedule, calculating processor idle times during the transformation of business data, determining whether to rearrange the transformation of business data in the tables between the processors, etc. Processor 605 can include a plurality of cores. Computer system 600 includes media reader 640 to read the instructions from computer readable storage medium 655 and store the instructions in storage 610 or in random access memory (RAM) 615. Storage 610 provides a large space for keeping static data where at least some instructions could be stored for later execution. According to some embodiments, such as some in-memory computing system embodiments, RAM 615 can have sufficient storage capacity to store much of the data required for processing in RAM 615 instead of in storage 610. In some embodiments, all of the data required for processing may be stored in RAM 615. The stored instructions may be further compiled to generate other representations of the instructions and dynamically stored in RAM 615. Processor 605 reads instructions from RAM 615 and performs actions as instructed. According to one embodiment, computer system 600 further includes output device 625 (e.g., a display) to provide at least some of the results of the execution as output including, but not limited to, visual information to users and input device 630 to provide a user or another device with means for entering data and/or otherwise interact with computer system 600. Each of these output devices 625 and input devices 630 could be joined by one or more additional peripherals to further expand the capabilities of computer system 600. Network communicator 635 may be provided to connect computer system 600 to network 650 and in turn to other devices connected to network 650 including other clients, servers, data stores, and interfaces, for instance. The modules of computer system 600 are interconnected via bus 645. Computer system 600 includes a data source interface 620 to access data source 660. Data source 660 can be accessed via one or more abstraction layers implemented in hardware or software. For example, data source 660 may be accessed by network 650. In some embodiments data source 660 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to generate visual work instructions for assembling a variant of a product, comprising:
   compiling, at a computer, information to assemble a plurality of product variants, determined by a plurality of routing operations and allocation of a plurality of components to the plurality of routing operations;
   determining one or more attributes for each of the plurality of product variants;
   based on the compiled information, visually simulating, at the computer, a sequence of instructions to assemble the plurality of product variants, each instruction in the sequence of instructions including information on how to assemble different ones of the plurality of product variants;
   verifying based on the compiled information an order of the plurality of routing operations and the allocation of the plurality of components to the plurality of the routing operations;
   receiving a request to assemble a particular variant of the plurality of product variants;
   generating, by a processor of the computer, individualized visual work instructions corresponding to the sequence of instructions to assemble the requested product variant;
   displaying only portions of the individualized visual work instructions that are needed to assemble the requested product variant at an assembly line; and
   suppressing the display of work instruction elements unnecessary for assembling the requested product variant.

2. The computer implemented method of claim 1, further comprising:
   receiving a request to assemble a desired variant of the product of the plurality of variants of the product; and
   based on the request, generating a configuration including one or more attributes associated with the desired variant of the product, wherein based on the configuration, the superset of visual work instructions is reducible to a subset of visual work instructions to assemble the desired variant of the product.

3. The computer implemented method of claim 2, further comprising:
   reducing the superset of visual work instructions to the subset of visual work instructions by excluding one or more visual work instructions from the superset of visual work instructions, based on the configuration; and
   rendering the subset of visual work instructions to be displayed at a product assembly facility.

4. The computer implemented method of claim 3, wherein rendering the subset of visual work instructions comprises: rendering the subset of visual work instructions on a display device associated with a computing system at an assembly line, selected from a group consisting of a mobile device, an enterprise resource planning system, and a manufacturing execution system, to direct the assembling of the desired variant of the product.

5. The computer implemented method of claim 2, further comprising: rendering the superset of visual work instructions and the configuration to display the subset of visual work instructions at a product assembly facility by suppressing one or more visual work instructions from the superset of visual work instructions based on the configuration.

6. The computer implemented method of claim 2, wherein receiving the request to assemble the desired variant of the product comprises: receiving a selection of the one or more attributes corresponding to the desired variant of the product.

7. The computer implemented method of claim 1, wherein compiling the information to assemble the plurality of variants of the product comprises: retrieving a three-dimensional visual representation of the plurality of variants of the product.

8. The computer implemented method of claim 1, wherein simulating the sequence of instructions to assemble the plurality of variants of the product, comprises:
   rendering on a user interface, visualizations of the plurality of components as allocated to the plurality of the routing operations according to the order of the plurality of the routing operations, wherein a visualization of a component of the plurality of components is determined by at least one camera position of a plurality of camera positions;

receiving a selection of visualizations of the plurality of visualizations of the plurality of components as allocated to the plurality of the routing operations, corresponding to the sequence of instructions to assemble the plurality of variants of the product.

9. The computer implemented method of claim 8, further comprising: reordering the allocation of a component of the plurality of components, for a routing operation of the plurality of routing operations.

10. The computer implemented method of claim 1, wherein generating the superset of visual work instructions comprises:

associating a routing operation of the plurality of routing operations with a procedure of a plurality of procedures of the superset of visual work instructions;

associating a camera position available for the routing operation, with a step of the procedure; and assigning a visualization, corresponding to the camera position, of a component allocated to the routing operation, to the step of the procedure.

11. A computer system to generate visual work instructions for assembling a variant of a product, comprising:

a processor; and one or more memory devices communicatively coupled with the processor and the one or more memory devices storing instructions to:

receive a request to assemble a desired product variant of a plurality of product variants;

retrieve a superset of visual work instructions to assemble the plurality of product variants;

based on the request, generate a configuration file containing individualized visual work instructions to assemble the desired product variant, the individualized visual work instructions being a subset of the superset of visual work instructions;

displaying only portions of the individualized visual work instructions that are needed to assemble the requested product variant at an assembly line; and suppressing the display of work instruction elements unnecessary for assembling the requested product variant.

12. The computer system of claim 11, wherein the one or more memory devices storing further instructions to:

compile information to assemble the plurality of variants of the product, determined by a plurality of routing operations and allocation of one or more components for each routing operation from the plurality of routing operations;

based on the compiled information, simulate a sequence of instructions to assemble the plurality of variants of the product to verify an order of the plurality of routing operations and the allocation of one or more components for each routing operation; and upon verification, generate the superset of visual work instructions corresponding to the sequence of instructions to assemble the plurality of variants of the product.

13. The computer system of claim 12, wherein compiling the information to assemble the plurality of variants of the product comprises: retrieve a three-dimensional visual representation of the plurality of variants of the product.

14. The computer system of claim 12, wherein generating the superset of visual work instructions comprises:

associate a routing operation of the plurality of routing operations with a procedure of a plurality of procedures of the superset of visual work instructions;

associate a camera position available for the routing operation, with a step of the procedure; and assign a visualization, corresponding to the camera position, of a component allocated to the routing operation, to the step of the procedure.

15. The computer system of claim 11, wherein the one or more memory devices storing further instructions to:

reduce the superset of visual work instructions to the subset of visual work instructions by excluding one or more visual work instructions from the superset of visual work instructions, based on the configuration file; and render the subset of visual work instructions at a product assembly line in a manufacturing process.

16. The computer system of claim 15, wherein rendering the subset of visual work instructions, comprises: render the subset of visual work instructions on a display device associated with a computing system selected from a group consisting of a mobile device, an enterprise resource planning system, and a manufacturing execution system, to direct the assembling of the desired variant of the product.

17. The computer system of claim 11, wherein the one or more memory devices storing further instructions to: render the superset of visual work instructions and the configuration file to suppress one or more visual work instructions from the superset of visual work instructions.

18. The computer system of claim 11, wherein receiving the request to assemble the desired variant of the product comprises: receive a selection of the one or more attributes corresponding to the desired variant of the product.

19. A non-transitory computer readable storage medium tangibly storing instructions, which when executed by a computer, cause the computer to execute operations comprising:

receive a request to assemble a desired product variant of a plurality of product variants;

retrieve a superset of visual work instructions to assemble the plurality of product variants;

based on the request, generate a configuration file containing individualized visual work instructions to assemble the desired product variant, the individualized visual work instructions being a subset of the superset of visual work instructions;

displaying only portions of the individualized visual work instructions that are needed to assemble the requested product variant at an assembly line; and suppressing the display of work instruction elements unnecessary for assembling the requested product variant.

20. The non-transitory computer readable storage medium of claim 19 storing instructions, which when executed by the computer, cause the computer to execute operations further comprising:

compile information to assemble the plurality of variants of the product, determined by a plurality of routing operations and allocation of one or more components for each routing operation from the plurality of routing operations;

based on the compiled information, simulate a sequence of instructions to assemble the plurality of variants of the product to verify an order of the plurality of routing operations and the allocation of one or more components for each routing operation; and upon verification, generate the superset of visual work instructions corresponding to the sequence of instructions to assemble the plurality of variants of the product.

* * * * *